United States Patent

[11] 3,558,017

[72] Inventors Vahn J. Soojian
  Pompton Lakes;
  Richard H. Jackson, Glen Rock, N.J.
[21] Appl. No. 717,839
[22] Filed Apr. 1, 1968
[45] Patented Jan. 26, 1971
[73] Assignee Howe Richardson Scale Company
  Clifton, N.J.
  a corporation of Delaware

[54] MATERIAL FEED APPARATUS
  6 Claims, 2 Drawing Figs.
[52] U.S. Cl. .................................................... 222/342,
  222/413; 198/213
[51] Int. Cl. ........................................................ B65g 33/08
[50] Field of Search ........................................ 222/231,
  342, 413, 236; 198/64, 213

[56] References Cited
  UNITED STATES PATENTS
  908,610  1/1909  Rice et al. ..................... 222/413

| 2,858,011 | 10/1958 | Wahl | 222/413X |
| 3,013,701 | 12/1961 | Joschko | 222/342X |
| 3,088,637 | 5/1963 | Stone | 222/413 |
| 3,142,419 | 7/1964 | Burke | 222/236 |

Primary Examiner—Robert B. Reeves
Assistant Examiner—Frederick R. Handren
Attorney—Norris & Bateman ABSTRACT: Particulate and particularly wet sticky loose material is dispensed from a receptacle containing a mass of the material by a rotating hollow feed screw conveyor in the form of a hollow coil structure rotated about its longitudinal axis, and a floating scraper rod extending longitudinally within the relatively rotating coil structure eliminates buildup of material within the screw and thereby prevents undesired reduction of the feed rate and eventual feed stoppage. The invention insures a substantially uniform feed rate of the material.

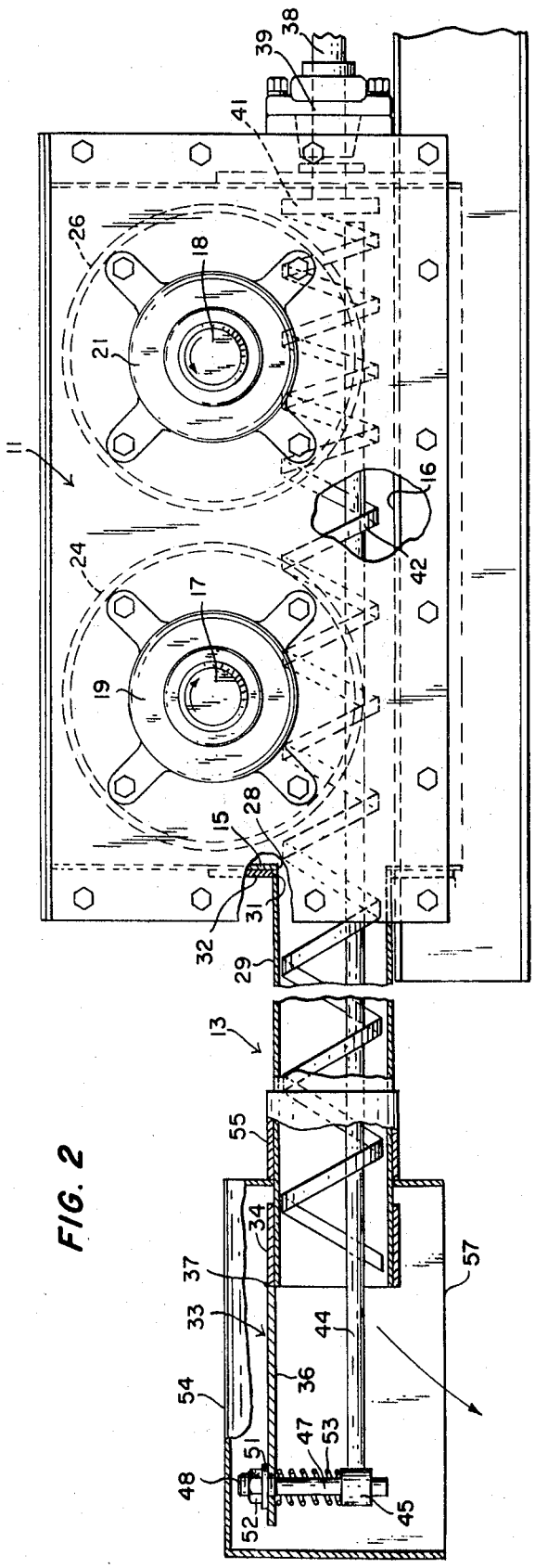
FIG. 2
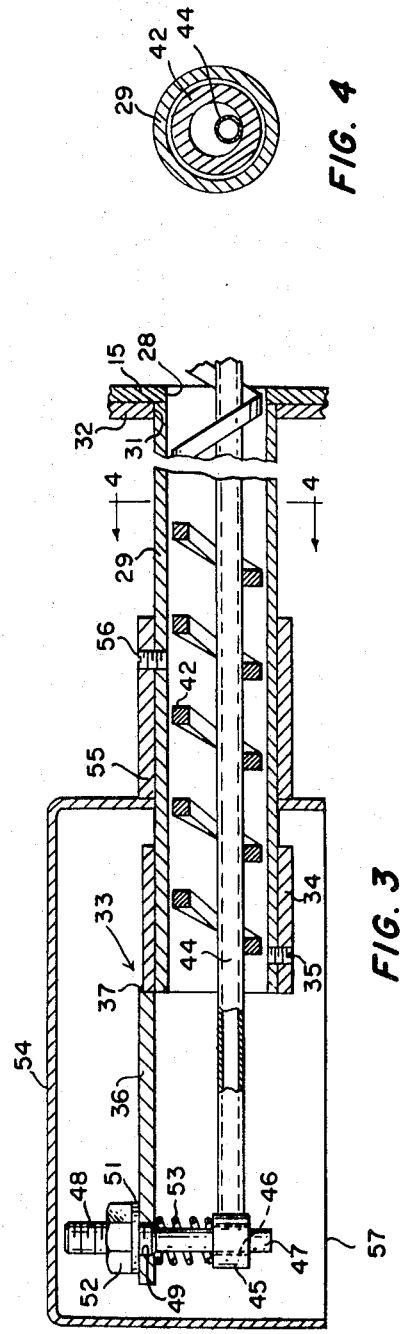
FIG. 4
FIG. 3
INVENTORS
VAHN J. SOOJIAN
and RICHARD H. JACKSON
BY Norris & Bateman
ATTORNEYS

PATENTED JAN 26 1971

INVENTORS
VAHN J. SOOJIAN
and RICHARD H. JACKSON

BY *Norris & Bateman*

ATTORNEYS 3,558,017

MATERIAL FEED APPARATUS

BACKGROUND AND SUMMARY OF INVENTION

There has been considerable activity in the development of apparatus for dispensing finely powdered and like loose particulate material from a bin or like receptacle. For example, Burke U.S. Pat. No. 3,142,419 discloses an inclined wall bin wherein oppositely rotating transverse feed screws tend to collect and move the material inwardly and downwardly onto a longitudinally disposed discharge feed screw conveyor that dispenses the material from the receptacle. Various types of discharge feed screws have been tried and one of those that has proved preferable for many materials is the so-called coreless auger type wherein the screw is a hollow wire coil structure rotatable about its longitudinal axis.

The invention is primarily concerned with improving this hollow coil feed screw structure. One of the chief problems attendant to feed of particulate material by such hollow coil structures is that of gradual accumulation of material, particularly wet sticky material within the structure. This problem is solved in the invention wherein the chief object is to prevent such blocking or choking of the feed screw so as to maintain a substantially uniform dispensing of material from the receptacle.

More particularly the invention provides a relatively longitudinally fixed, and preferably nonrotatable, rod or like member extending along the length of the feed coil structure in blocking relation upon the inner diameter of the relatively rotating hollow coil structure to there effect a wiping or scraping action preventing buildup of the material. This is another object of the invention, and other and more specific objects such as the inclusion of a light resilient spring bias urging the floating rod against the coil inner periphery will appear as the description and claims appear.

BRIEF DESCRIPTION OF DRAWINGS

FIG. 2 is a side elevation of the apparatus of FIG. 1, with the outlet structure partially broken away and in section to show detail;

FIG. 3 is an enlarged fragmentary view in section at the outlet discharge showing the floating hollow screw conveyor clearing rod;

FIG. 4 is a section on line 4—4 of FIG. 3; and

PREFERRED EMBODIMENTS

Figure 1:
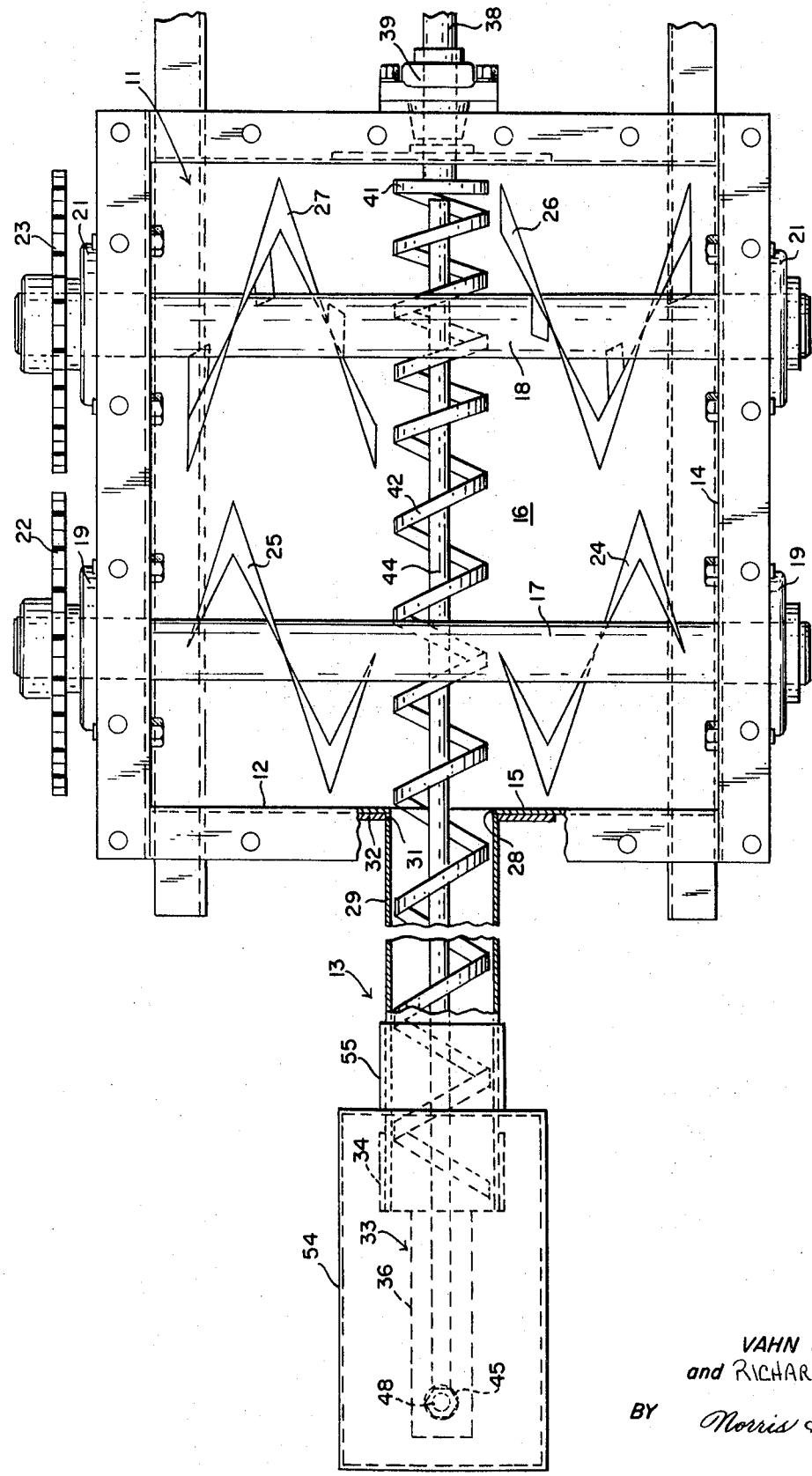
FIG. 1 is a tip plan view partly broken away and in section showing a material dispensing apparatus according to a preferred embodiment of the invention.
Figure 5:
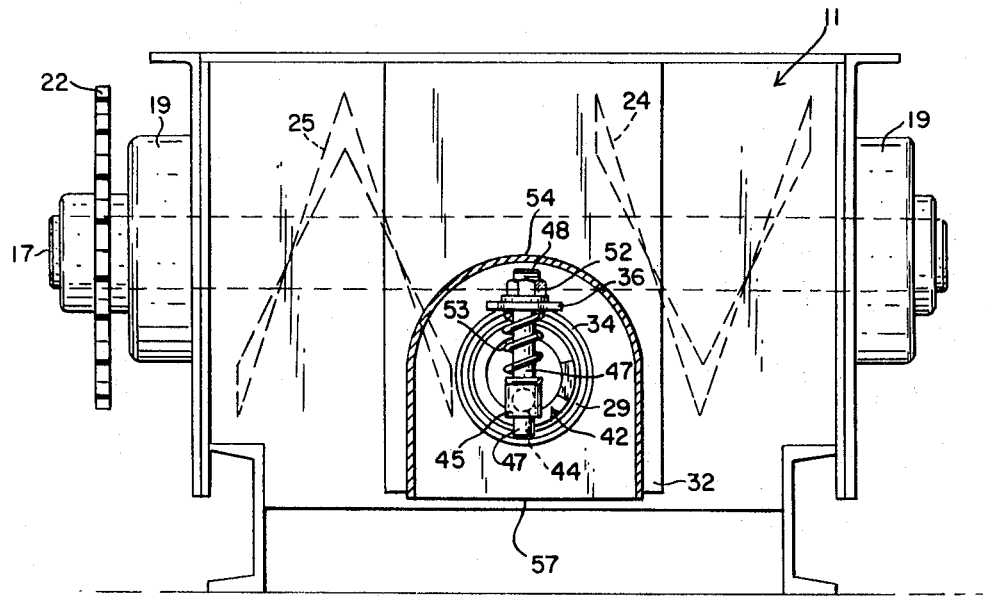
FIGS. 5 and 6 are respectively front and rear end views of the apparatus of FIGS. 1—3.
Figure 6:
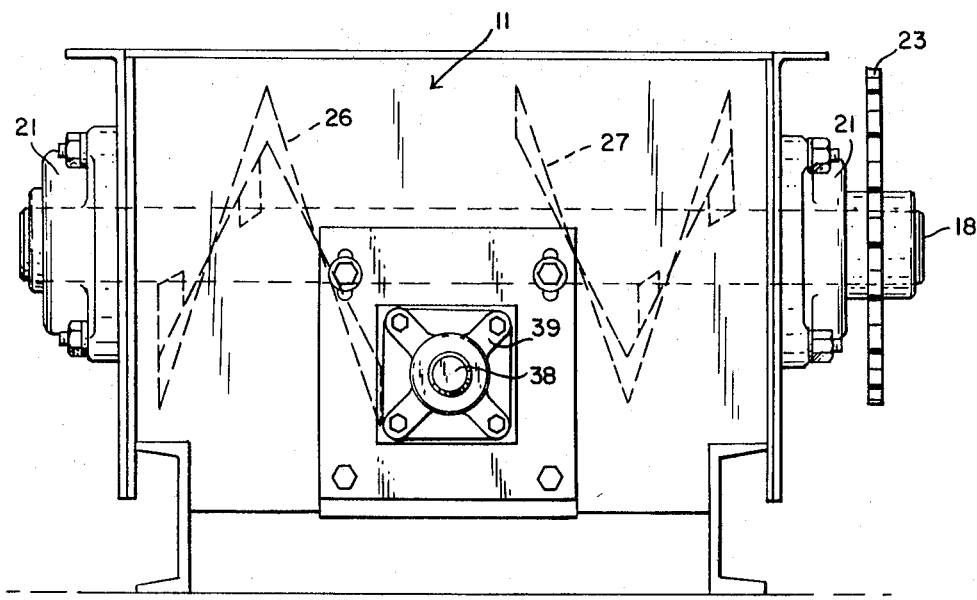

The invention will be described for purposes of illustration in the embodiment wherein relatively fine particulate material is dispensed from a storage or like bin 11 having an open top 12 and a discharge outlet indicated at 13.

Bin 11 comprises sidewalls 14 and end walls 15 that preferably incline slightly downwardly and inwardly to a generally horizontal floor 16. Spaced parallel shafts 17 and 18 are rotatably mounted at the same horizontal level in bearing an dust seal units 19 and 21 respectively suitably detachably mounted in the opposite sidewalls 14. Shafts 17 and 18 are continuously rotated in opposite directions as indicated by the arrows in FIG. 2 as by suitable drive means (not shown) acting on gears 22 and 23 on the respective shafts.

A pair of separate axially spaced oppositely spiraled ribbons 24 and 25 are secured upon shaft 17, and a similar pair of separate axially spaced oppositely spiraled ribbons 26 and 27 are secured on shaft 18. These ribbons constitute feed screws that, when the shafts are oppositely rotated as shown, will tend to move the bulk material in the bin away from the sidewalls 14 toward the lower part of the central space within the bin bottom.

The front end wall 15 of the bin is formed just above floor 16 with a circular opening 28, and a cylindrical outlet tube 29 extends outwardly coaxially of that opening. Preferably the inner end of tube 29 is secured as by welding within the aperture 31 of a rigid plate 32 that in turn is secured upon the bin sidewall 15. Thus outlet tube 29 is fixed upon the bin 11.

Referring to FIG. 3, a bracket 33 is secured upon the outer end of tube 29. Bracket 33 comprises a cylindrical collar 34 that surrounds the outer end of tube 29 and is secured to tube 29 as by one or more screws 35. A horizontally projecting support bar 36 is secured as by welding at 37 to collar 34.

A shaft 38 continuously driven from a suitable source of power (not shown) is mounted in a bearing and dust seal unit 39 at the rear end of the bin and projects through the bin rear wall to terminate in a head 41. A coreless hollow screw 42 which comprises an elongated uniform inner and outer diameter wound coil of space cross section wire has its rear end fixed to head 41 and it projects forwardly above the floor 16 and (see FIG. 1) through the bottom of space between the feed screws on shafts 17 and 18 to extend through tube 29. Preferably the coil 42 is longitudinally self-supporting out of contact with floor 16, and its periphery lies in a cylindrical envelope that lies close to but out of contact with the interior of tube 29. Coil 42 terminates short of the end of tube 29.

A scraper member in the form of a longitudinally fixed rod 44 is substantially horizontally floatingly mounted in the assembly to extend longitudinally through the interior of coil 42. Rod 44 is preferably hollow for lightweight and it preferably lies in wiping contact with the inner cylindrical periphery of the relatively rotating screw coil 42. In practice the forward end of rod 44 has rigidly secured thereto a block 45 having a through bore 46.

A cylindrical pin 47 is formed on the lower end of a threaded stud 48 which is rotatably mounted in a threaded aperture 49 in bar 36. Pin 47 extends vertically freely through bore 46 of the scraper rod. A washer 51 and a lock nut 52 are mounted on stud 48 above the bar 36, and a spring 53 surrounding pin 47 is compressed between bar 36 and block 45 so as to continuously exert a light downward pressure on the outer end of rod 44. Rod 44 is restrained against axial movement and substantial rotation about its axis by engagement of pin 47 in bore 46, and it is supported form below only by the internal surfaces of coil 42 so that rod 44 effectively floats within the coil 42. This float is effectively controlled by the light pressure of spring 53. It will be noted that rod 44 extends all the way through coil 42 and ends near head 41.

A hood 54 is rigid with a mounting collar 55 secured upon tube 29 as by screws 56. As shown in FIG. 3, hood 54 extends protectively over the bracket 33 and the outer end of rod 44 and has an open lower end 57 for directing downward discharge of material emerging from tube 29.

In operation material in bin 11 will be fed by operation of the feed screws on shafts 17 and 18 toward overlying relation with the rear portion of rotating coil 42 that lies in the bin just above floor 16. As coil 42 rotates it displaces the material to the left in FIG. 1 out through tube 29 to discharge downwardly at hood 54.

Were it not for rod 44 some of the materials being thus dispensed from the bin such as very fine powders and particularly wet and/or sticky granular and powdered materials would tend to gradually accumulate within the coil structure to clog and choke the flights of the screw coil 42 to reduce and eventually arrest feed of the material. Rod 44 which lies in light but positive contact along the inner periphery of the relatively rotating screw feed coil 42 effectively scrapes the inner coil periphery and prevents the formation of choking deposits, to thus maintain a desired uniform feed rate of the material.

By maintaining uniform rate of feed, accuracy of dispensing is achieved. It has also been found that the light pressure of the floating rod along the coil structure tends to stabilize rotation of the coil and prevent it from undesirable vibration or whipping.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, an all changes which come within the meaning and range of equivalency of the claims are therefore intended to be embraced therein.

We claim:

1. Apparatus for the controlled positive dispensing of relatively loose particulatelike material comprising a receptacle for containing a mass of said material, means defining a lateral discharge outlet from said receptacle, and feed means extending through the material mass to said outlet comprising a substantially screw type feed structure in the form of hollow coil means adapted to be rotated about its longitudinal axis, and means for preventing accumulation of said material within the rotating coil means comprising a longitudinally fixed member extending longitudinally through said hollow coil means and having a surface adjacent the inner periphery of said rotatable hollow coil means, and mounting means for said member providing for floating movement of said member in a direction transversely of said hollow coil means.

2. The apparatus defined in claim 1, wherein said longitudinally fixed member is floatingly supported by the relatively rotating inner periphery of said hollow coil means.

3. Apparatus for the controlled positive dispensing of relatively loose particulatelike material comprising a receptacle for containing a mass of said material, means defining a lateral discharge outlet from said receptacle, and feed means extending through the material mass to said outlet comprising a substantially screw type feed structure in the form of hollow coil means adapted to be rotated about its longitudinal axis, and means for preventing accumulation of said material within the rotating coil means comprising a relatively stationary longitudinal member of appreciably smaller diameter than the coil means extending eccentrically of the longitudinal axis of said hollow coil means and closely adjacent the inner periphery of said hollow coil means.

4. Apparatus for the controlled positive dispensing of relatively loose particulatelike material comprising a receptacle for containing a mass of said material, means defining a lateral discharge outlet from said receptacle, and feed means extending through the material mass to said outlet comprising a substantially screw type feed structure in the form of hollow coil means adapted to be rotated about its longitudinal axis, and means for preventing accumulation of said material within the rotating coil means comprising a nonrotatable longitudinally fixed member floatingly supported by the relatively rotating inner periphery of said hollow coil means, and means whereby said member is resiliently urged against said inner periphery of the hollow coil means.

5. The apparatus defined in claim 4, wherein said member is a rod slidably mounted at one end on a guide outside the receptacle for permitting floating movement, and the other end of the rod is free except for support by the coil means.

6. Apparatus for the controlled positive dispensing of relatively loose particulatelike material comprising a receptacle for containing a mass of said material, means comprising a tube projecting laterally from an opening in the receptacle sidewall defining a lateral discharge outlet from said receptacle, and feed means extending through the material mass to said outlet comprising a substantially screw type feed structure in the form of substantially horizontal hollow coil means adapted to be rotated about its longitudinal axis, said hollow coil means extending at one end into said tube, and means for preventing accumulation of said material within the rotating coil means comprising a rodlike element resting on the inner periphery of said coil means and having a slidable connection to said tube exteriorly of the receptacle that prevents rotation and longitudinal displacement of the rod but permits generally radial float of the rod within the relatively rotating hollow coil means.